July 29, 1969  NOBUO MIYAJIMA  3,457,788
APPARATUS FOR SAMPLING CARBON BLACK
Filed Dec. 29, 1966

NOBUO MIYAJIMA
*INVENTOR.*

BY L. DAVID TRAPNELL

United States Patent Office 3,457,788
Patented July 29, 1969

3,457,788
APPARATUS FOR SAMPLING CARBON BLACK
Nobuo Miyajima, Yokoshiba-machi, Sanbugun, Chiba Prefecture, Japan, assignor to Continental Carbon Company, Houston, Tex., a corporation of Delaware
Filed Dec. 29, 1966, Ser. No. 605,634
Int. Cl. G01n 1/00; B07b 4/12, 1/22
U.S. Cl. 73—422    1 Claim

ABSTRACT OF THE DISCLOSURE

A sampling device for obtaining finely divided solids from a line carrying hot moist gases comprising a suction conduit communicating with the line and connected to the upper portion of a cyclone apparatus having a removable sample receiver connected to the bottom of the cyclone. The cyclone including a second conduit with a valve therein attached to the upper portion, and an exhaust conduit connected to the top of the cyclone communicating with an ejector means for discharge of exhaust gas from the cyclone.

---

Figure 1:
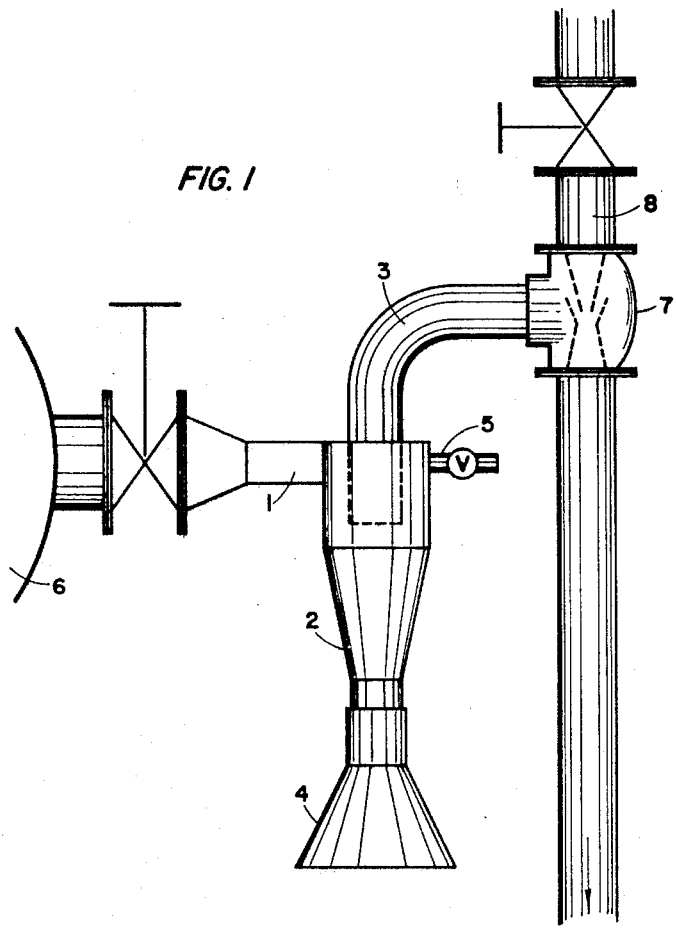

This invention relates to apparatus for obtaining samples of finely divided solids suspended in a moist aerosol stream of elevated temperature, such as carbon black, at a place and time in the production thereof that will enable timely evaluation of the black to determine production of a quality material or enable adjustment of operating conditions to obtain such material. Particularly, the present invention is directed to a sampling apparatus for obtaining samples of carbon black production from the downstream end of the reaction chamber by withdrawing the black in conjunction with the gaseous effluent components of carbon black reaction.

In general, equipment for the production of carbon black for rubber use consists essentially of a reactor, a collector, a pelletizer, and a dryer. Carbon black is a light and fluffy powedr before it is pelletized, and it takes three to five hours, depending upon the size of the equipment, for the carbon black to pass through the processing equipment above. Accordingly, if a sample is taken out right after the pelletizer where it is easiest to handle, it is difficult to determine and monitor operating conditions at an appropriate time. Therefore, it is necessary to make samplings of the black right after the reactor production in order to determine appropriate operating conditions immediately.

To this end the heat resistant filter bag is generally employed as a common sampling means; however, as a carbon black product is fluffy before being pelletized, it is difficult to collect the black completely with such filter bags. Further, the resistance of the bag to filtration increases so much that the sampling time is extended to the extent that substantial time is required for adequate sampling. In addition the sample contains some moisture which requires at least ten minutes for the subsequent drying process when utilizing a filter bag. Furthermore, a considerable pollution problem is encountered due to the leakage of carbon black that occurs around the prior art reactor samplers, so that it is unsuitable in view of environment sanitation as well as maintenance of the plant.

Fluffy carbon black immediately after exit from the reactor is suspended in the combustion gas effluent stream at a temperature of 400° C. or so, and contains a high moisture content, and the filter cloth of a bag filter will be exceedingly eroded even though heat resisting filter cloth like glass fiber is used for sample collection.

An object of the present invention is to provide a means for obtaining a sample of carbon black from the conduit extending immediately from the reactor for producing the same.

Another object of the present invention is to provide a sampling apparatus that provides for quickly obtaining a sample of the carbon black reactor production without loss of sample to the atmosphere.

A further object of the present invention is to provide a carbon black sampling apparatus for use in the reactor area that avoids the difficulties of the prior art practices.

Based on an extensive study of the above deficiencies, the inventor has devised a novel means for readily sampling fluffy, high moisture carbon black from the reactor without the defects referred to above. The sampling equipment of the present invention consists of a suction conduit, a small cyclone connected at the upper part of said suction conduit and having a receiver at the bottom, an exhaust conduit connected to the top of said cyclone and an ejector secured to said exhaust conduit.

Figure 2:
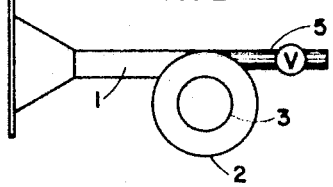

The present invention will be more easily understood from reading the description hereinafter and by reference to the accompanying drawings wherein:

FIGURE 1 is a front elevation view of the sampling apparatus of the present invention; and FIGURE 2 is a plan view of the cyclone portion of the sampling apparatus.

Referring more particularly to the drawings, the sampling apparatus receives the high moisture hot combustion gas containing carbon black by introduction through suction conduit 1 from the reactor connection 6 through a valve interposed therebetween, said connection 6 communicating with the processing reactor (not shown). The gas from said stream passes through the upper portion of cyclone 2 through exhaust conduit 3 responsive to the suction force created by ejector means 7 in fluid conduit 8, wherein water or other suitable fluid is passed. Cyclone 2 communicates at its lower end with the sample receiver 4 and there is provided a conduit and valve 5 in the upper portion of said cyclone to adjust pressure in said cyclone to achieve the desired cyclonic separation action within the cyclone. The cyclone body 2 is completely insulated from heat, or if necessary, it is heated by an appropriate means so as to keep it at the temperature higher than the dew point of the combustion gas.

In operation, a carbon black sample is collected in an almost dry state whereby the pollution with condensed water that is most objectionable for the subsequent sample analysis is avoided. If glass fiber filter bags are used to sample the black, a pressure in the sampling duct in the range of +50–200 mm. water column is required; however, the present invention enables the use of less pressure, even to several thousand mm. negative pressure in water column depending on the selection of the ejector means.

The size and dimension of the suction ducts and the cyclone body are preferred to be in a suitable range so that the carbon black fines and particles are collected substantially completely.

The exhaust gas after being separated from the carbon black in the cyclone body 2 by the cyclone principal is absorbed through the exhaust conduit 3 into the ejector means 7 while the carbon black sample is collected in the receiver 4. The carbon black contains fine particles that are very difficult to collect completely in a cyclone; however, the present equipment using the ejector as an absorber will completely collect the exhaust gas containing carbon black by means of the fluid pressure employed for the purpose of absorbing and preventing discharge of such exhaust into the atmosphere.

By applying the present invention to sampling for the quantity of carbon black necessary for analysis requires only a few minutes, and the sample with less moisture is better suited for analysis than samples obtained by the presently available equipment.

The following table sets forth the results of sampling obtained by the two procedures referred to above, particularly the sampling by the present invention and by means of a glass fiber bag of the prior art, said sampling conducted on a carbon black containing combustion gas stream at a temperature of 420° C., a velocity of 8–13 m. per second, and a moisture content of 45%.

|  | Quantity collected (g.) | Time required for collection (min.) | Pressure in reactor duct | Moisture, percent |
|---|---|---|---|---|
| Present invention | 10 | 4 | −50 mm. H₂O | 0.5 |
| Glass fiber bag | 3 | 20 | +100 mm. H₂O | (¹) |

¹ Drying is absolutely necessary, because moisture in the collected sample is not uniformly distributed.

Having described my invention hereinbefore, what I claim as new and desire to secure by Letters Patent is:

1. Apparatus for sampling finely divided solids from a hot, moist gas stream comprising a suction conduit fixed to a source conveying said stream; a cyclone having an upper connection with said suction; a sample receiver removably affixed to the bottom of said cyclone; a second conduit attached to the upper portion of said cyclone and a valve connected in said second conduit; an exhaust conduit connected to the top of said cyclone; and an ejector means communicating with said exhaust conduit.

References Cited

UNITED STATES PATENTS

| 2,091,613 | 8/1937 | Polston | 73—422 |
| 3,070,990 | 1/1963 | Krinov | 73—421.5 XR |

FOREIGN PATENTS

| 447,047 | 3/1948 | Canada. |

LOUIS R. PRINCE, Primary Examiner

H. C. POST III, Assistant Examiner

U.S. Cl. X.R.

209—266, 270, 459, 468